US 12,078,376 B2

(12) United States Patent
Fraas et al.

(10) Patent No.: US 12,078,376 B2
(45) Date of Patent: Sep. 3, 2024

(54) AIR CONDITIONING SYSTEM AND ASSOCIATED METHOD OF OPERATION

(71) Applicant: Mahle International GmbH, Stuttgart (DE)

(72) Inventors: Marc Fraas, Bietgheim-Bissingen (DE); Florian Klein, Bad Liebenzell-Moettlingen (DE); Michael Markus, Ilsfeld (DE); Oliver Schultze, Stuttgart (DE)

(73) Assignee: Mahle International GmbH (DE)

( * ) Notice: Subject to any disclaimer, the term of this patent is extended or adjusted under 35 U.S.C. 154(b) by 45 days.

(21) Appl. No.: 17/903,766

(22) Filed: Sep. 6, 2022

(65) Prior Publication Data

US 2023/0129486 A1 Apr. 27, 2023

(30) Foreign Application Priority Data

Sep. 6, 2021 (DE) ...................... 10 2021 209 825.8

(51) Int. Cl.
*F24F 11/72* (2018.01)
*F24F 110/50* (2018.01)

(52) U.S. Cl.
CPC ........... *F24F 11/72* (2018.01); *F24F 2110/50* (2018.01)

(58) Field of Classification Search
CPC ...... B60H 3/06; B60H 3/0625; B60H 3/0085; B60H 3/0092; B60H 3/0608; F24F 2110/50; F24F 11/72
See application file for complete search history.

(56) References Cited

U.S. PATENT DOCUMENTS 4,319,453 A * 3/1982 Mann ........................ F01N 3/06
60/309
4,407,354 A * 10/1983 Takishita ............. B60H 3/0625
237/12.3 A (Continued)

FOREIGN PATENT DOCUMENTS

DE 3526407 A1 2/1986
DE 3912013 A1 10/1990

(Continued)

OTHER PUBLICATIONS

English abstract for DE-102014225272.

(Continued)

*Primary Examiner* — Nelson J Nieves
(74) *Attorney, Agent, or Firm* — Fishman Stewart PLLC

(57) ABSTRACT

A method for operating an air-conditioning system that carries out an air quality testing cycle is disclosed. The air quality testing cycle includes: Step A: testing if the current pollutant concentration is below a predetermined first pollutant limit value; Step B: in the event that it is determined in the Step A that the current pollutant concentration is below the first pollutant limit value, testing if the bypass device is completely open or if the current flow rate of the blower device corresponds to a current air volume demand of the air-conditioning system; Step D: in the event that it is determined in the Step B that the bypass device is not completely opened or that the current flow rate does not correspond to the current air volume demand, testing current pollutant concentration is below a predetermined second pollutant limit value that is smaller than the first pollutant limit value.

21 Claims, 5 Drawing Sheets

(56) References Cited

U.S. PATENT DOCUMENTS

| | | | | |
|---|---|---|---|---|
| 4,512,147 | A * | 4/1985 | Wong | F01N 3/032 55/482 |
| 5,076,821 | A * | 12/1991 | Bruhnke | B60H 3/0625 96/400 |
| 5,256,103 | A * | 10/1993 | Abthoff | B60H 3/0625 454/158 |
| 5,954,577 | A * | 9/1999 | Meckler | B60H 3/0625 454/75 |
| 5,983,659 | A * | 11/1999 | Lemaitre | F24F 13/22 62/89 |
| 6,206,775 | B1 * | 3/2001 | Lemaitre | B60H 3/0085 454/75 |
| 11,480,082 | B2 * | 10/2022 | Wang | B01D 46/62 |
| 2009/0150090 | A1 * | 6/2009 | Brodsky | B60H 3/0085 702/31 |
| 2017/0334267 | A1 * | 11/2017 | Jeong | B01D 53/8687 |
| 2018/0250621 | A1 * | 9/2018 | Scholz | B01D 46/521 |
| 2019/0070926 | A1 * | 3/2019 | Eberle | B60H 1/008 |
| 2019/0160418 | A1 * | 5/2019 | Matsumoto | B01D 53/261 |
| 2019/0234857 | A1 * | 8/2019 | Adam | B60H 3/06 |
| 2020/0247219 | A1 * | 8/2020 | Kleinow | B60H 3/0085 |
| 2021/0170832 | A1 * | 6/2021 | Tanimori | B60H 1/008 |
| 2022/0153084 | A1 * | 5/2022 | Pecchia | B60H 3/0078 |
| 2023/0375211 | A1 * | 11/2023 | Abe | F24F 11/77 |

FOREIGN PATENT DOCUMENTS

| | | |
|---|---|---|
| DE | 4105724 A1 | 9/1992 |
| DE | 102008042856 A1 | 4/2010 |
| DE | 102014225272 A1 | 7/2015 |

OTHER PUBLICATIONS

English abstract for DE-3526407.
English abstract DE-3912013.
German Search Report for DE-102021209825.8, dated Mar. 10, 2022.

\* cited by examiner

AIR CONDITIONING SYSTEM AND ASSOCIATED METHOD OF OPERATION

CROSS-REFERENCE TO RELATED APPLICATION

This application claims priority to German Application No. DE 10 2021 209 825.8 filed on Sep. 6, 2021, the contents of which are hereby incorporated by reference it its entirety.

TECHNICAL FIELD

The present invention relates to a method for operating an air-conditioning system of a motor vehicle having a vehicle interior. In addition, the present invention relates to an air-conditioning system which is suitable for carrying out this operating method and which is equipped with a control device for carrying out this operating method.

BACKGROUND

An air-conditioning system of a motor vehicle having a vehicle interior serves for air-conditioning an air stream of circulating air and/or fresh air provided for being introduced into the vehicle interior. It can comprise a flap device that is adjustable in multiple stages with respect to the circulating air content in the air stream and a blower device that is adjustable in multiple stages with respect to its flow rate for driving the air stream in a flow direction. Further, the air-conditioning system can comprise a main filter device for filtering the air stream and an additional filter device for filtering the air stream. Furthermore, the air-conditioning system can comprise a bypass device that is adjustable in multiple stages for opening and closing for bypassing the additional filter device and an air quality sensor device for detecting a current pollutant concentration in the air stream, which can comprise at least one air quality sensor which can be arranged for example with respect to the flow direction downstream of the main filter device, downstream of the additional filter device and downstream of the bypass device.

From DE 10 2014 225 272 A1 an air-conditioning system is known which comprises a main filter device and an additional filter device and a bypass device for bypassing the additional filter device. In this known air-conditioning system, the bypass device is configured so that the entire air stream in any division can be conducted through the main filter device and through the additional filter device. With completely closed bypass device, the entire air stream then flows exclusively through the additional filter device. With completely opened bypass device, the entire air stream then flows exclusively through the main filter device. For this purpose, the two filter devices are arranged so that they can be flowed through in parallel.

The air-conditioning systems having two filter devices can solve these different filtration tasks. For example, the main filter device can mainly act as particle filter in order to filter out a particulate contamination. The additional filter device can to a particular degree be designed for gaseous contaminations, such as for example in order to filter odours out of the air stream. Depending on the concept, it can be provided to conduct the air stream, depending on contamination, only through the main filter device or only through the additional filter device or proportionally through the main filter device and through the additional filter device. Likewise conceivable is a configuration in which the filter devices are arranged in series, so that the air stream first flows through the main filter device and following this through the additional filter device. With the help of the bypass device, the air stream can then be divided downstream of the main filter device over the additional filter device and a bypass path bypassing the additional filter device.

Main filter device and additional filter device can have different service lives. For reducing the maintenance costs it is desirable to achieve preferably uniform and preferably long service lives for the main filter device and for the additional filter device, so that in the maintenance case both filter devices can be changed at the same time.

The present invention deals with the problem of showing for such an air-conditioning system or for an associated operating method a way which makes possible a cost-effective maintenance, wherein in particular optimised service lives for the main filter device and for the additional filter device are aimed at.

According to the invention, this problem is solved through the subjects of the independent claims. Advantageous embodiments are subject of the dependent claims.

SUMMARY

The invention is based on the general idea of regularly carrying out an air quality testing cycle during the operation of the air-conditioning system. By verifying the current air quality the flow through the additional filter device can be adjusted as a function of requirement, as a result of which the service life of the same can be improved.

An operating method according to the invention contains such an air quality testing cycle, wherein this air quality testing cycle comprises the following steps. The steps are denoted by letters and are preferably carried out or executed in alphabetic order.

In a Step A it is tested if the current pollutant concentration in the air stream is below a predetermined first pollutant limit value. It is clear that the air quality sensor device for this purpose comprises at least one air quality sensor in the air stream downstream of the main filter device and downstream of the additional filter device in order to measure the pollutant concentration in the air stream.

In the event that it is determined in the Step A that the current pollutant concentration is below the first pollutant limit value it is tested in a Step B if the bypass device is completely opened or if the current flow rate of the blower device corresponds to a current air volume demand of the air-conditioning system.

In the event that it is determined in the Step B that the bypass device is not completely opened or that the current flow rate does not correspond to the current air volume demand it is tested in a Step D if the current pollutant concentration is below a predetermined second pollutant limit value that is smaller than the first pollutant limit value.

In the event that it is determined in the Step D that the current pollutant concentration is not below the second pollutant limit value, the current air quality testing cycle according to Step O is continued in a Step E.

In the Step O, the current air quality testing cycle is terminated. The terminating of the air quality testing cycle can in particular include a storing of the data of the current air quality testing cycle.

Accordingly, the pollutant concentration can be tested two times or in two stages by way of two different pollutant limit values in order to optimise the flow through the auxiliary filter device dependent on requirement.

In an advantageous further development, the air quality testing cycle can additionally comprise a Step C, in which in the event that it is determined in Step B that the bypass device is completely opened or that the current flow rate corresponds to the current air volume demand, the current air quality testing cycle is continued according to Step O so that the same is terminated.

The air quality testing cycle can now be optionally carried out in a comfort mode or in a service life mode. In the comfort mode, the air quality testing cycle remains largely unnoticed by the vehicle occupants. In the service life mode by contrast, the loading of the auxiliary filter device is optimised. Accordingly, the comfort mode is slightly at the expense of the service life of the auxiliary filter device while the service life mode is slightly at the expense of the comfort of the vehicle occupants.

For the comfort mode, the Steps B and D of the air quality testing cycle are changed to Steps B1 and D1, wherein in the Step B1 in the event that it is determined in Step A that the current pollutant concentration is below the first pollutant limit value it is tested if the bypass device is completely open. In the Step D1 it is tested in the event that it is determined in the Step B1 that the bypass device is not completely open, if the current pollutant concentration is below the second pollutant limit value.

According to an advantageous further development, the Step C can be additionally changed to Step C1 in the comfort mode in such a manner that in the Step C1 in the event that it is determined in the Step B1 that the bypass device is fully open, the current air quality testing cycle according to Step O is continued and accordingly terminated.

In the comfort mode, the air quality testing cycle can optionally comprise the following additional steps.

In the event that it is determined in the Step D1 that the current pollutant concentration is below the second pollutant limit value the bypass device in a Step F1 is actuated for opening by one step. This step is based on the consideration that the air quality is too good when undershooting the second pollutant limit value and accordingly the additional filter device is unnecessarily loaded. By enlarging the bypass content, the loading and charging of the additional filter device is reduced and its service life increased.

After the opening of the bypass device by one step, the current air quality testing cycle is reset to Step A in a Step G1 so that it is subsequently tested again if the current pollutant concentration is below the first pollutant limit value. In this way, the bypass content can be increased in steps until the air quality is no longer too good so that the pollutant concentration is no longer below the second pollutant limit value but merely good enough so that the pollutant concentration is still below the first pollutant limit value.

In the comfort mode, the air quality testing cycle can additionally comprise the following steps.

In the event that it is determined in Step A that the current pollutant concentration is not below the first pollutant limit value it is tested in a Step H1 if the bypass device is completely closed.

In the event that it is determined in the Step H1 that the bypass device is completely closed, it is tested in a Step I1 if on the blower device a maximum flow rate is adjusted.

In the event that it is determined in Step I1 that on the blower device the maximum flow rate is adjusted, the current air quality testing cycle is continued in a Step J1 according to Step O. Here, the current air quality testing cycle is terminated since with closed bypass and with maximum flow rate the performance limit of the air-conditioning system with respect to the air purification is reached.

In a further development of the comfort mode the following steps can be additionally provided.

In the event that it is determined in the Step I1 that on the blower device the maximum flow rate is not adjusted, the flap device in a Step K1 is actuated for increasing the circulating air content in the air stream by one step. By increasing the circulating air content more air is repeatedly conducted through the filter devices as a result of which the air quality is improved. For this purpose it is assumed that an external contamination source is present which is located outside the vehicle interior, i.e. in surroundings of the vehicle. If, on the other hand, an internal contamination source, which is located within the vehicle interior, would be present, the recirculated air component would have to be reduced.

Following the amendment or increasing or reducing, respectively, of the circulating air content by one step, the current air quality testing cycle is reset to Step A in a Step L1 so that it is again tested if the current pollutant concentration is below the first pollutant limit value. Thus, the circulating air content can be increased in steps until the air quality corresponds to the demands, i.e. until the pollutant concentration falls below the first pollutant limit value.

Additionally, further steps for the comfort mode can be provided.

In the event that it is determined in the Step H1 that the bypass device is not completely closed, the bypass device can in a Step M1 be actuated for closing by one step. As a consequence, the bypass content is reduced in order to conduct proportionally more air volume through the additional filter device, which increases the air quality.

Following the closing of the bypass device by one step, the current air quality testing cycle is reset in a Step N1 to Step A, so that it is again tested if the current pollutant concentration is below the first pollutant limit value. Thus, the bypass device is closed in steps here until the air quality corresponds to the demands, i.e. until the pollutant concentration falls below the first pollutant limit value.

By contrast, the air quality testing cycle for the service life mode is modified in that the Steps B and D are changed to the Steps B2 and D2 as follows.

In the event that it is determined in the Step A that the current pollutant concentration is below the first pollutant limit value it is tested in the Step B2 if the current flow rate of the blower device corresponds to a current air volume demand of the air-conditioning system.

In the event that it is determined in the Step B2 that the current flow rate does not correspond to the current air volume demand it is tested in the Step D2 if the current pollutant concentration is below the second pollutant limit value.

According to an advantage further development, the Step C can be additionally changed to Step C2 in the service life mode in such a manner that in the Step C2 in the event that it is determined in the Step B2 that the current flow rate corresponds to the air volume demand, the current air quality testing cycle is continued according to Step O and accordingly terminated.

In the service life mode, the air quality testing cycle can additionally comprise the following steps.

In the event that it is determined in the Step D2 that the current pollutant concentration is below the second pollutant limit value, the flap device in a Step F2 is actuated for reducing the circulating air content in the air stream by one step. This step is based on the consideration that when the second pollutant limit value is undershot, the air quality is too good and accordingly the additional filter device is unnecessarily loaded. By reducing the circulating air content, the loading and charging of the additional filter device is reduced and its service life increased.

Following the reducing of the circulating air content in the air stream by one step, the current air quality testing cycle is reset to Step A in a Step G2, so that it is again tested if the current pollutant concentration is below the first pollutant limit value. In this way, the circulating air content can be reduced in steps until the air quality is no longer too good so that the pollutant concentration is no longer below the second pollutant limit value but only good enough so that the pollutant concentration is only below the first pollutant limit value.

According to a further development of the service life mode, the air quality testing cycle can additionally comprise the following steps.

In the event that it is determined in the Step A that the current pollutant concentration is not below the first pollutant limit value it is tested in a Step H2 if on the blower device a maximum flow rate is adjusted.

In the event that it is determined in the Step H2 that on the blower device the maximum flow rate is adjusted, it is tested in a Step I2 if the bypass device is completely closed.

In the event that it is determined in the Step I2 that the bypass device is completely closed, the current air quality testing cycle according to Step O is continued in a Step J2, i.e. terminated.

Optionally, the service life mode can be additionally complemented by the following additional steps.

In the event that it is determined in the Step I2 that the bypass device is not completely closed, the bypass device is actuated in a Step K2 for closing by one step. By reducing the bypass content, the content of the air stream that is conducted through the additional filter device is increased, which improves the filtration and increases the air quality.

Following this, the current air quality testing cycle can be reset in a Step L2, i.e. after the closing of the bypass device by one step, to Step A, so that it is again tested if the current pollutant concentration is below the first pollutant limit value. Accordingly, the bypass content can be reduced in this way in steps until the air quality is sufficiently good, i.e. until the pollutant concentration falls below the first pollutant limit value.

A further improvement of the service life mode can include the following additional steps.

In the event that it is determined in the Step H2 that on the blower device the maximum flow rate is not adjusted, the flap device for increasing the circulating air content in the air stream is actuated in a Step M2 by one step. By increasing the circulating air content, more air is repeatedly conducted through the additional filter device as a result of which the filtration of the same is improved. For this purpose it is assumed that an external contamination source is present which is located outside the vehicle interior, i.e. in surroundings of the vehicle. If, on the other hand, an internal contamination source, which is located within the vehicle interior, would be present, the recirculated air component would have to be reduced.

In a following Step N2, the current air quality testing cycle is reset to Step A after the amendment or increasing or reducing, respectively, of the circulating air content in the air stream by one step, so that it is again tested if the current pollutant concentration is below the first pollutant limit value. In this way, the circulating air content can be reduced in steps until the air quality is sufficiently good, i.e. until the pollutant concentration falls below the first pollutant limit value.

For starting the air quality testing cycle an initiation operation can be optionally carried out, in which for example multiple parameters are pre-set. For example, for preparing the air quality testing cycle, a minimum value for the fresh air content in the air stream can be determined. This corresponds to a maximum value for the circulating air content in the air stream. Here, different parameters can be taken into account such as for example the number of the vehicle occupants, a current $CO_2$ value in the vehicle interior, a humidity value as well as a current status regarding opening states of windows of the vehicle interior. Additionally or alternatively, an air volume demand of the air conditioning system can be determined. Here, too, different parameters can be taken into account such as for example operating inputs of the users or vehicle occupants, an anti-misting requirement, a de-icing requirement as well as a cooling requirement. Optionally, system data can be updated by way of current service life data of the main filter device and the additional filter device.

The air quality testing cycle described above is mainly practical in particular when the contamination of the air stream is mainly caused by sources of dirt located outside the vehicle, i.e. in surroundings. Such external sources of dirt are for example environmental pollutions such as fine dust and pollen as well as unpleasant odours in an industrial or agricultural environment. An internal source of dirt by contrast is located in the vehicle interior and can be formed for example by the occupants or by loaded material. For example, the interior room air is consumed by the breathing of the vehicle occupants. Likewise, dogs, cats and other animals that are carried along in the vehicle can form such an internal source of dirt.

Some measures of the air quality testing cycle described above for reducing the pollutants such as for example the increase of the circulating air content, are only practical in particular when the pollutants originate from an external source of dirt. In the event of an unexpected additional internal source of dirt, these measures can however be counter-productive. There is therefore the need for being able to detect the presence of an additional internal source of dirt.

The operating method extensively described above carries out the respective air quality testing cycle preferentially subject to the assumption that a predetermined standard situation with at least one vehicle occupant is present in the vehicle interior. By way of a seat occupancy detection it can be determined for example how many vehicle occupants are actually present in the vehicle interior. The air-conditioning system can then adjust itself accordingly. Additional internal sources of dirt by contrast cannot be detected or only with difficulty.

According to an advantageous embodiment, the operating method can additionally carry out a dirt source detection cycle, with the help of which such additional internal sources of dirt can be determined. In the event that an additional internal source of dirt is detected, it can be provided according to an advantageous embodiment to deactivate or even invert the Steps K1 in the comfort mode and M2 in the service life mode so that the circulating air content is not increased but reduced in order to improve the air quality.

According to a first embodiment, the dirt source detection cycle can comprise the following steps.

In a Step P1 it is tested if a current dirt concentration in the vehicle interior is below a predetermined dirt limit value. The dirt concentration in the vehicle interior can be determined for example within the circulating air that is discharged from the vehicle interior and fed to the air-conditioning system. The air quality in the vehicle interior can be likewise determined. It is clear that the air quality sensor device then comprises at least one air quality sensor in the circulating air stream or in the vehicle interior. The dirt concentration of the dirt source detection cycle can correspond in particular to the pollutant concentration of the air quality testing cycle or be identical to the same. The pollutant limit value can in particular correspond identically to the first pollutant limit value or be identical to the same.

In the event that it is determined in the Step P1 that the dirt concentration in the vehicle interior is below the dirt limit value, the dirt source detection cycle is continued in a Step Q1 according to Step V1.

In the event that it is determined in the Step P1 that the dirt concentration in the vehicle interior is not below the dirt limit value, the flap device for adjusting to circulating air mode is actuated in a Step R1 in such a manner that the air stream contains a maximum circulating air content. The maximum adjustable circulating air content can be 100% in the ideal case. However it is usual that the air-conditioning system still adds a certain fresh air content to the air stream even with maximum adjusted circulating air content.

Following the adjusting of the circulating air mode it is tested in a Step S1 if an actual decrease of the dirt concentration in the vehicle interior is greater than an expected decrease of the dirt concentration in the vehicle interior calculated by way of service life data of the main filter device and of the additional filter device.

In the event that it is determined in the Step S1 that the actual decrease is greater than the expected decrease it is then determined in a Step T1 that no internal source of dirt is present. The dirt source detection cycle is then continued according to Step V1.

In the event that it is determined in the Step S1 that the actual decrease is not greater than the expected decrease it is determined in a Step U1 that an internal source of dirt is present. Following this, the dirt source detection cycle according to Step V1 is continued.

According to Step V1, the current dirt source detection cycle is finally terminated. For terminating the dirt source detection cycle it can be provided in particular that the data of the same are stored.

In a second embodiment of the dirt source detection cycle the following steps are carried out.

In a Step P2, an expected dirt concentration in the vehicle interior is additionally calculated by way of a current dirt concentration of the vehicle surroundings and current service life data of the main filter device and of the auxiliary device. Here, a current vehicle occupancy, i.e. the number of the vehicle occupants, can be additionally taken into account. The current dirt concentration of the vehicle surroundings can be determined for example by means of an air quality sensor in the fresh air.

In a Step Q2, the current dirt concentration in the vehicle interior, respectively in the circulating air stream, is measured. Apart from this it is tested if the currently measured dirt concentration is within a predetermined tolerance range. Here, this tolerance range is predetermined independently of the vehicle surroundings and the current service life data of the filter devices and is generally not adjustable or variable.

In the event that the currently measured dirt concentration is within the tolerance range it is determined in a Step R2 that no internal source of dirt is present. The dirt source detection cycle is then continued according to Step V2.

In the event that the currently measured dirt concentration is not within the tolerance range, it is tested in a Step S2 if the currently measured dirt concentration is greater than the expected dirt concentration.

In the event that it is determined in the Step S2 that the currently measured dirt concentration is greater than the expected dirt concentration it is determined in a Step T2 that an internal source of dirt is present. The dirt source detection cycle is then continued according to Step V2.

In the event that it is determined in the Step S2 that the currently measured dirt concentration is not greater than the expected dirt concentration it is determined in a Step U2 that an additional internal dirt sink is present. In this case, too, the dirt source detection cycle is then continued according to Step V2. An additional internal dirt sink can be formed for example by a dirt-absorbing loading of the vehicle interior.

Finally, the current dirt source detection cycle is terminated in the Step V2. For terminating the dirt source detection cycle it can be provided in particular that the data of the same are stored.

An air-conditioning system according to the invention is provided for a motor vehicle which comprises a vehicle interior and serves for air-conditioning an air stream consisting of circulating air and/or fresh air and which is provided for being introduced into the vehicle interior. The air-conditioning system comprises a flap device that is adjustable in multiple stages with respect to the circulating air content in the air stream, a blower device that is adjustable in multiple stages with respect to its flow rate for driving the air stream in a flow direction, a main filter device for filtering the air stream, an additional filter device for filtering the air stream, a bypass device that is adjustable in multiple stages for opening and closing, for bypassing the additional filter device, an air quality sensor device for detecting a current pollutant concentration in the air stream, as well as a control device which for operating the air-conditioning system is coupled to the flap device, to the blower device, to the bypass device and to the air quality sensor device. Apart from this, this control device is configured and/or programmed for carrying out an operating method of the type described above.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
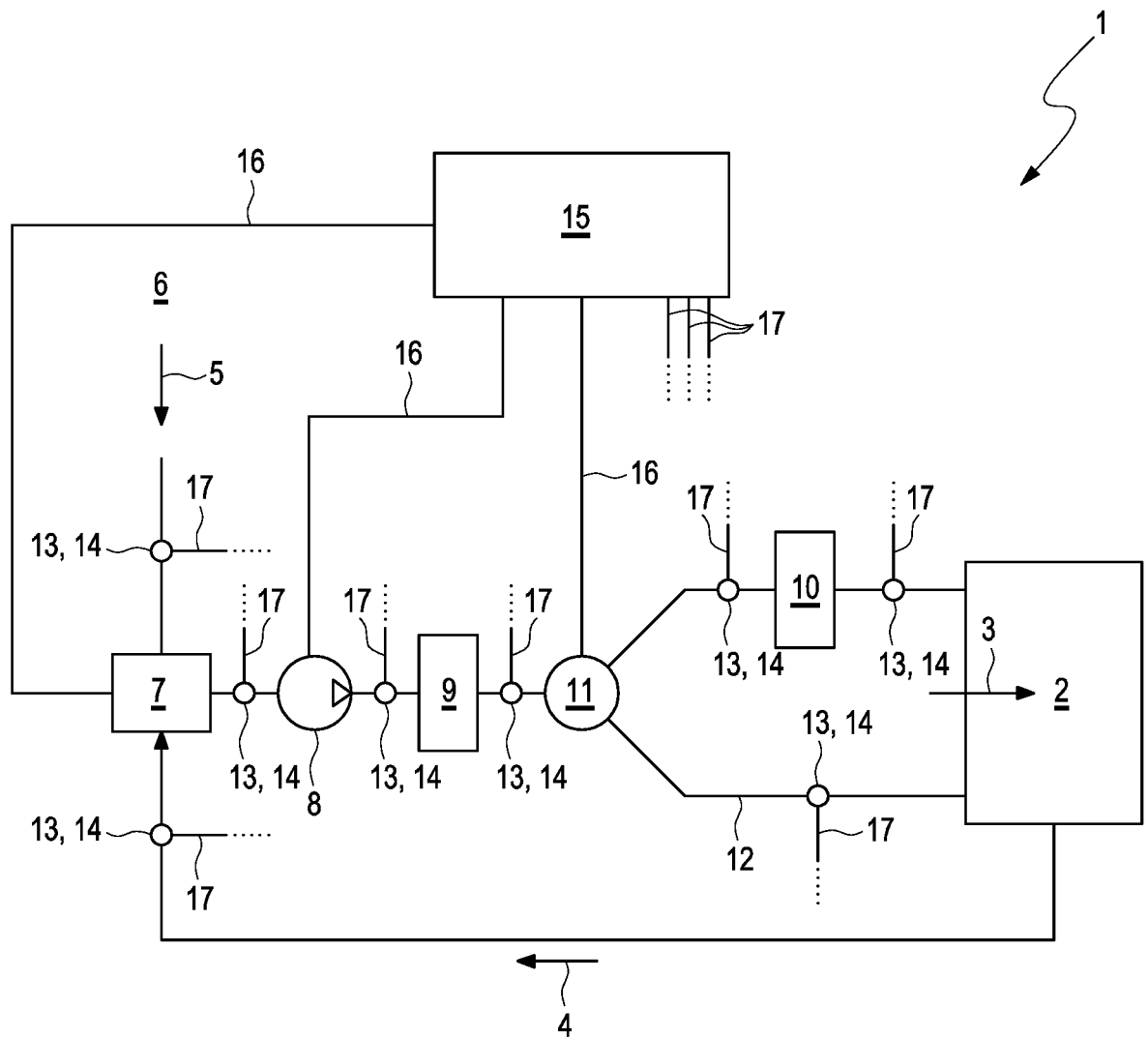
FIG. 1 a greatly simplified circuit-diagram-like schematic representation of an air-conditioning system, FIG. 2 a block diagram for a first embodiment of an air quality testing cycle of an operating method, FIG. 3 a block diagram for a second embodiment of an air quality testing cycle of the operating method, FIG. 4 a block diagram for a first embodiment of a dirt source detection cycle of the operating method, FIG. 5 a block diagram for a second embodiment of the dirt source detection cycle of the operating method.

According to FIG. 1, an air-conditioning system 1 serves for air-conditioning a vehicle interior 2 of a motor vehicle which is not otherwise shown. For this purpose, the air-conditioning system 1 air-conditions an air stream 3 symbolised by an arrow, which is finally fed to the vehicle interior 2. Here, this air stream 3 consists of circulating air 4 indicated by an arrow, which is discharged from the vehicle interior 2, and/or of fresh air 5 indicated by an arrow, which is fed in or suctioned from surroundings 6 of the vehicle.

The air-conditioning system 1 comprises a flap device 7 which is adjustable in multiple stages with respect to the circulating air content in the air stream 3. Further, the air-conditioning system 1 comprises a blower device 8 for driving the air stream in a flow direction, which is adjustable with respect to its flow rate. Further, the air-conditioning system 1 is equipped with a main filter device 9 and with an additional filter device 10, which each serve for filtering the air stream 3. Each of these filter devices 9, 10 comprises at least one filter element. Further, the air-conditioning system 1 is equipped with a bypass device 11 for bypassing the additional filter device 10, which is adjustable in multiple stages for opening and closing. In the example of FIG. 1, the additional filter device 10 is arranged downstream of the main filter device 9. Further, the bypass device 11 here is configured and positioned so that it can divide as desired the entire air stream 3 conducted through the main filter device over the additional filter device 10 and over a bypass path 12 of the bypath pass device 11, bypassing the additional filter device 10. In this embodiment, the air stream 3 is thus always conducted through the main filter device 9 and, dependent on requirement, conducted through the additional filter unit 10 with variable content.

Generally, a different constellation is also conceivable such as is knows for example from DE 10 2014 225 272 A1 and which by express reference is hereby added in full. In such a different constellation, the bypass device 11 is arranged and configured so that the air stream 3 thereby can be distributed over the main filter device 9 and over the additional filter device 10 as desired.

In addition, the air-conditioning system 1 is equipped with an air quality sensor device 13 for detecting the current pollutant concentration in the air stream 3, which comprises at least one air quality sensor 14 or pollutant sensor 14. In the example of FIG. 1, multiple different air quality sensors 14 are purely exemplarily shown in different positions within the air-conditioning system 1. It is clear that basically a single air quality sensor 14 can suffice. Practically, at least two air quality sensors 14 are provided in different positions.

The air-conditioning system 1 is additionally equipped with a control device 15 which is coupled via corresponding control lines 16 to the controllable components of the air-conditioning system 1 mentioned here. Accordingly, the control device 15 is coupled here via the control lines 16 to the flap device 7, to the blower device 8 and to the bypass device 11. By way of signal lines 17, the control device 15 is in connection with the air quality sensors 14 of the air quality sensor device 13.

The control device 15 is configured or programmed for carrying out an operating method described in more detail in the following by way of the FIGS. 2 to 5, with which the air-conditioning system 1 can be operated.

Figure 2:
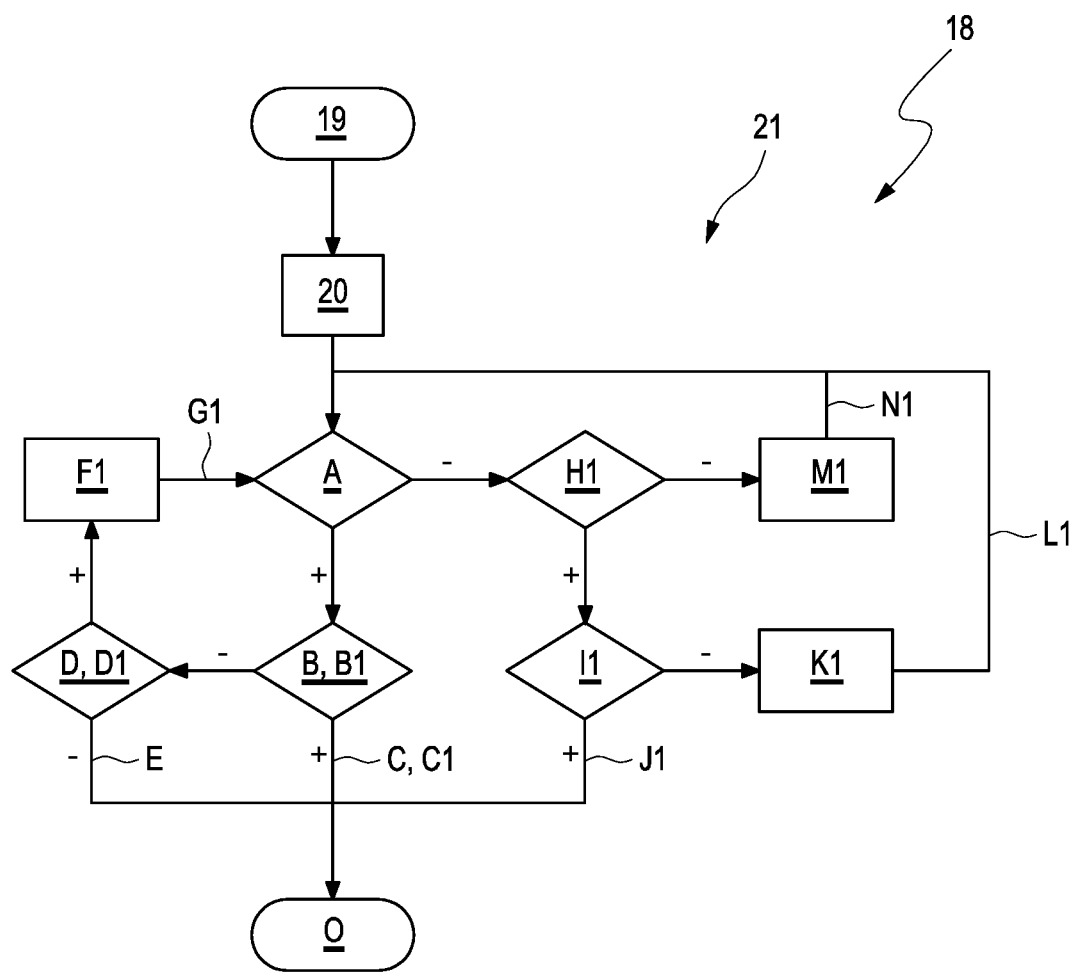
Figure 3:
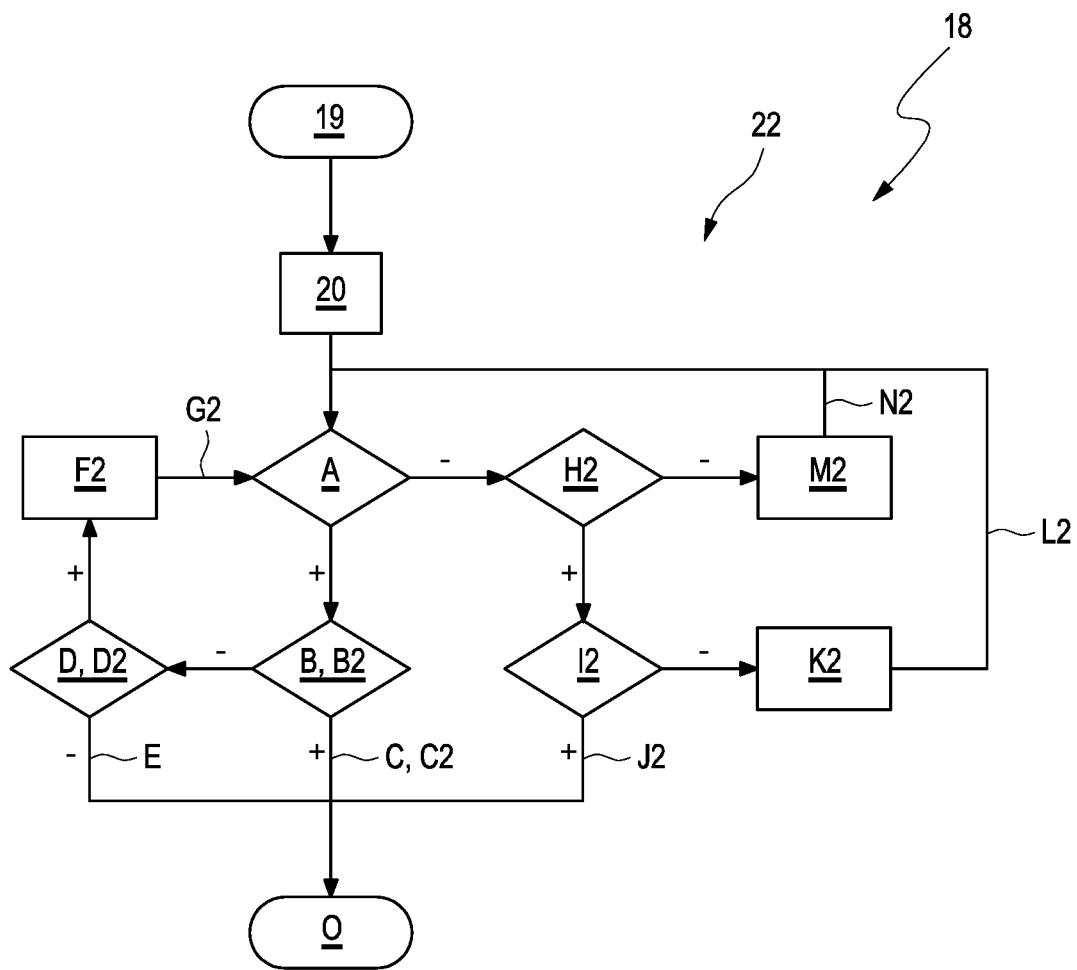

This operating method contains an air quality testing cycle 18, which is reflected in the FIGS. 2 and 3 for two different embodiments as block diagram. Within the operating method, this air quality testing cycle 18 is carried out automatically, in particular periodically during the operation of the air-conditioning system 1.

According to FIGS. 2 and 3, the start of the respective air quality testing cycle 18 takes place in a field 19. After the start 19, an initiation operation can be optionally carried out in a block 20, in which for example multiple parameters are pre-set. For example, for preparing the air quality testing cycle 18, a minimum value for the fresh air content in the air stream 2 can be determined in the block 20. This corresponds to a maximum value for the circulating air content in the air stream 3. Here, different parameters can be taken into account such as for example the number of the vehicle occupants, a current $CO_2$ value in the vehicle interior, a humidity value and a current status of the opening states of windows of the vehicle interior. Additionally or alternatively, an air volume demand of the air-conditioning system 1 can be determined in the block 20. Here, too, different parameters can be taken into account such as for example operating inputs of the users or vehicle occupants, an anti-misting requirement, a de-icing requirement as well as a cooling requirement. Optionally, system data can be updated by way of current service life data of the main filter device 9 and the additional filter device 10.

In the following, the air quality testing cycle 18 for a comfort mode 21 is initially described with reference to FIG. 2. In a Step A, a test is carried out if the current pollutant concentration in the air stream 3 is below a predetermined first pollutant limit value. If this is the case (+), a test is carried out in a Step B or B1 if the bypass device 11 is completely open. If this is not the case (−), a test is carried out in the Step D or D1 if the current pollutant concentration is below a predetermined second pollutant limit value, which is smaller than the first pollutant limit value. If this is not the case (−), a continuation of the air quality testing cycle according to Step O is carried out according to a Step E. Here, Step O represents the termination of the current air quality testing cycle 18 with all measures required for this purpose, such as for example a storing of the required data of the air quality testing cycle 18.

When by contrast it is determined in the Step B or B1 that the bypass device is completely open (+), the current air quality testing cycle 18 according to Step O is continued according to Step C or C1, i.e. terminated.

If according to FIG. 2 it is determined in Step D1 that the current pollutant concentration is below the second pollutant limit value (+), the bypass device 11 is actuated in a Step F1 for opening by one step. Following this, the current air quality testing cycle 18 is reset to Step A according to a Step G1.

If it is now determined in the Step A that the current pollutant concentration is not below the first pollutant limit value (−), it is tested in a Step H1 if the bypass device 11 is completely closed. If the bypass device 11 is completely closed (+), it is tested in a Step I1 if on the blower device 8 a maximum flow rate is adjusted. If on the blower device 8 the maximum flow rate is adjusted (+), the current air quality testing cycle 18 according to Step O is continued in a Step J1, i.e. terminated.

If by contrast it is determined in the Step I1 that on the blower device 8 the maximum flow rate is not adjusted (−), the flap device 7 is actuated in a Step K1 for increasing the circulating air content in the air stream 3 by one step. Following this, the current air quality testing cycle 18 is reset to Step A according to a Step L1.

Provided, by contrast, it is determined in the Step H1 that the bypass device 11 is not completely closed (−), the bypass device 11 is actuated in a Step M1 for closing by one step. Following this, the current air quality testing cycle 18 is reset to Step A in a step N1.

In the following, a service life mode 22 for the air quality testing cycle 18 is explained in more detail by way of FIG. 3. Here, the Steps A and O are identical in the service life mode 22 and in the comfort mode 21. If the test in Step A in the service life mode 22 reveals that the current pollutant concentration is not below the first pollutant limit value (−), Step H2 follows. If by contrast the current pollutant concentration is below the first pollutant limit value (+), Step B or B2 follows.

In the Step B2 it is tested if the current flow rate of the blower device 8 corresponds to the current air volume demand of the air-conditioning system 1. If this is the case (+), the Step C or C2 follows. If by contrast this does not apply (−), the Step D or D2 follows.

In the Step C2, the current air quality testing cycle 18 is further pursued according to Step A, namely terminated.

In the Step D2 a test is carried out to determine if the current pollutant concentration is below the second pollutant limit value. If the test is positive (+), Step F2 follows. If by contrast the test is negative (−), Step E follows. According to Step E, the current air quality testing cycle 18 is then continued according to Step O, i.e. terminated. If by contrast the current pollutant concentration is not below the second pollutant limit value, the flap device 7 is actuated in the Step F2 for reducing the circulating air content in the air stream by one step. Following this, the current air quality testing cycle 18 can then be reset to Step A in the Step G2.

If it is now determined in the Step A that the current pollutant concentration is not below the first pollutant limit value, it is tested in the Step H2 if on the blower device 8 a maximum flow rate is adjusted. If this is the case (+), Step I2 follows. If by contrast this is not the case (−), Step M2 then follows.

In the Step I2, i.e. in the event that it is determined in the Step H2 that on the blower device 8 the maximum flow rate is adjusted, it is now tested if the bypass device 11 is completely closed. If this is the case (+), Step J2 then follows in which the current air quality testing cycle 18 is continued according to Step O, i.e. terminated.

If by contrast it is determined in Step I2 that the bypass device 11 is not completely closed (−), the bypass device 11 is actuated for closing by one step in the Step K2. Following this, the current air quality testing cycle 18 is reset to Step A in a Step L2.

If it is determined in the Step H2 that on the blower device 8 the maximum flow rate is not adjusted (−), the flap device 7 is actuated in the Step M2 for increasing the circulating air content in the air stream 3 by one step. Following this, the current air quality testing cycle 18 is reset to Step A in the Step N2.

Figure 4:
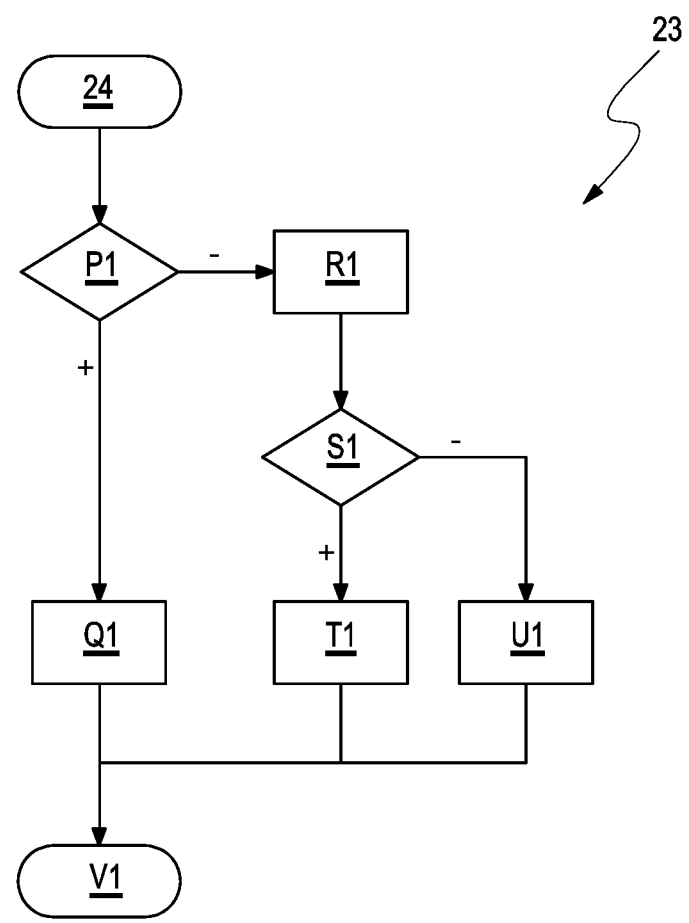
Figure 5:
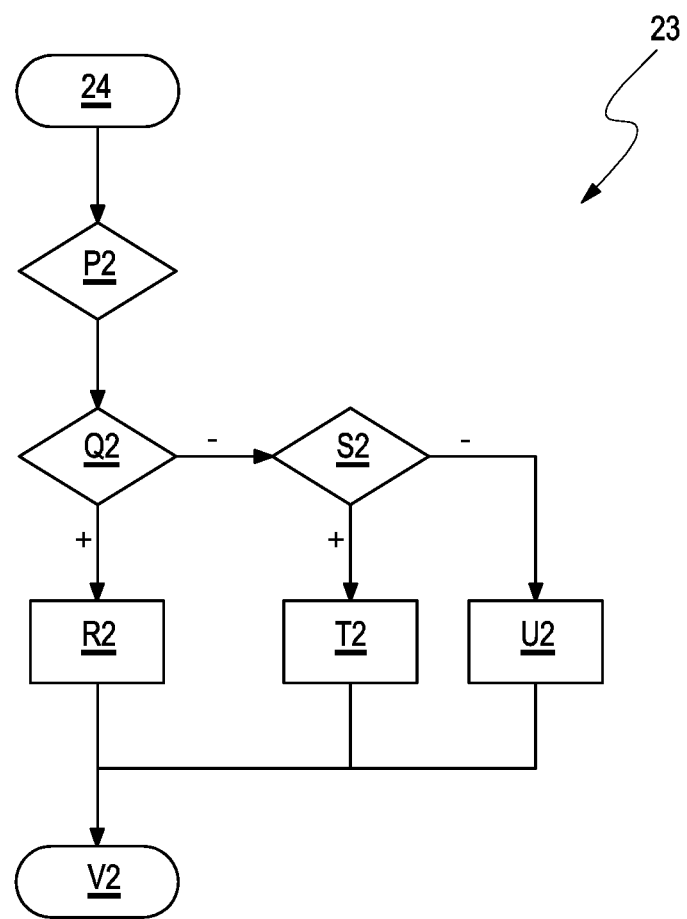

In the FIGS. 4 and 5, two embodiments for an air quality testing cycle 23 are reproduced, which can be carried out by the control device 15 during the operation of the air-conditioning system 1. Here, such a dirt source detection cycle 23 can be carried out before or after an air quality testing cycle 18.

According to FIG. 4, a block 24 represents the respective start of a dirt source detection cycle 23. In a Step P1 it is initially tested if a current dirt concentration in the vehicle interior 2 is below a predetermined dirt limit value. For the current dirt concentration in the vehicle interior 2, an air quality sensor 14 arranged in the circulating air stream 4 can be utilised for example. Practically, the dirt concentration of the dirt source detection cycle 23 can be identical to the pollutant concentration introduced further up in connection with the air quality testing cycle 18. In particular, the dirt limit value of the dirt source detection cycle 23 can be equal to the first pollutant limit value of the air quality testing cycle 18.

If this test in Step P1 proves to be positive (+), the continuation of the dirt source detection cycle 23 according to Step V1 follows in a Step Q1, wherein the Step V1 represents the termination of the dirt source detection cycle 23, wherein the result of the dirt source detection cycle 23 can be stored in a memory. In this case it is assumed in the Step Q1 that no additional internal source of dirt is present. If by contrast the test in the Step P1 is negative (−), the flap device 7 is actuated in a Step R1 for adjusting to circulating air mode in such a manner that the air stream 3 contains a maximum circulating air content. In particular, the air stream 3 then contains 100% circulating air 4.

In the following, it is tested in a Step S1 if an actual decrease of the dirt concentration in the vehicle interior 2 is greater than an expected decrease of the dirt concentration in the vehicle interior 2, which is calculated by way of service lives of the main filter device 9 and of the additional filter device 10. If this applies (+), Step T1 follows. If this does not apply (−), Step U1 follows thereafter. In Step T1 it is determined that no internal source of dirt is present. The dirt source detection cycle 23 is then continued according to Step V1, i.e. terminated. In the Step U1 it is determined by contrast that an internal source of dirt is present. Here, too, the dirt source detection cycle 23 is then continued according to Step V1, namely terminated.

FIG. 5 shows a different embodiment for the dirt source detection cycle 23. The dirt source detection cycle 23 also commences with a starting block 24 here. Following this, an expected dirt concentration in the vehicle interior 2 is calculated in a Step P2, namely by way of a current dirt concentration in the vehicle surroundings 6 and by way of current service lives of the main filter device 9 and of the additional filter device 10. Following this, a test, if the currently measured dirt concentration is within a predetermined tolerance range is carried out in the Step Q2. This predetermined tolerance range is in particular independent of the calculated, expected dirt concentration. If the test in the Step Q2 is positive (+), Step R2 follows. If by contrast the test in Step Q2 is negative (−), Step S2 follows. In Step R2 it is determined that no additional internal source of dirt is present, so that the dirt source detection cycle 23 can be continued according to Step V2. Here, the Step V2 represents the termination of the dirt source detection cycle 23, wherein the result of the dirt source detection cycle 23 can be stored in a memory.

In the Step S2, a test is carried out if the currently measured dirt concentration is greater than the expected dirt concentration. If this applies (+), Step T2 follows. If this does not apply (−), Step U2 follows. In Step T2 it is determined that an additional internal source of dirt is present. Following this, the dirt source detection cycle 23 can be continued or terminated according to Step V2. In Step U2 it is determined by contrast that an additional internal dirt sink is present. Following this, the dirt source detection cycle 23 is continued according to Step V2, i.e. practically terminated.

Provided that by means of the dirt source detection cycle 23 an additional internal source of dirt is identified, it can be provided according to a preferred embodiment that the air quality testing cycle 18 is modified. For example the Step K1 can be changed in the comfort mode 21 so that that the circulating air content is not increased but instead reduced by one step. Analogously to this, the Step M2 can be changed in the service life mode 22 so that that the circulating air content is not increased but instead reduced by one step.

The invention claimed is:

1. A method for operating an air-conditioning system of a motor vehicle having a vehicle interior,
wherein the air-conditioning system serves for air-conditioning an air stream provided for being introduced into the vehicle interior with at least one of circulating air and fresh air, comprises a flap device that is adjustable in multiple stages with respect to the circulating air content in the air stream, a blower device that is adjustable in multiple stages with respect to its flow rate for driving the air stream in a flow direction, a main filter device for filtering the air stream, an additional filter device for filtering the air stream, a bypasser that is adjustable in multiple stages for opening and closing for bypassing the additional filter device and an air quality sensor device for detecting a current pollutant concentration in the air stream,
wherein the air-conditioning systems carries out an air quality testing cycle that comprises the following steps:
Step A: measuring the current pollutant concentration relative to a predetermined first pollutant limit value,
Step B: in response to determining that the current pollutant concentration is below the first pollutant limit value in the Step A, testing the bypasser for a completely open position or the current flow rate of the blower device for correspondence to a current air volume demand of the air-conditioning system,
Step D: in response to determining that the bypasser is not completely opened or that the current flow rate does not correspond to the current air volume demand in the Step B, measuring the current pollutant concentration relative to a predetermined second pollutant limit value that is smaller than the first pollutant limit value,
Step E: in response to determining that the current pollutant concentration is not below the second pollutant limit value, continuing the current air quality testing cycle according to Step O,
Step O: terminating the current air quality testing cycle.

2. The method according to claim 1, wherein the air quality testing cycle further comprises the following step:
Step C: in response to determining in the Step B that the bypasser is completely open or that the current flow rate corresponds to the current air volume demand, continuing the current air quality testing cycle according to Step O.

3. The method according to claim 1, wherein the air quality testing cycle is carried out in a comfort mode where the Steps B and D are changed to Steps B1 and D1 as follows:
Step B1: in response to determining in the Step A that the current pollutant concentration is below the first pollutant limit value, testing if the bypasser is completely open,
Step D1: in response to determining in the Step B1 that the bypasser is not completely open, testing if the current pollutant concentration is below the second pollutant limit value.

4. The method according to the claim 3, wherein the comfort mode further includes Step C1 as follows:
Step C1: in response to determining in the Step B1 that the bypasser is completely open, continuing the current air quality testing cycle according to Step O.

5. The method according to claim 3, wherein the air quality testing cycle in the comfort mode additionally includes the following steps:
Step F1: in in response to determining in the Step D1 that the current pollutant concentration is below the second pollutant limit value, actuating the bypasser for opening by one step,
Step G1: after the opening of the bypasser by one step, resetting the current air quality testing cycle to Step A.

6. The method according to claim 3, wherein the air quality testing cycle in the comfort mode additionally includes the following steps:
Step H1: in response to determining in the Step A that the current pollutant concentration is not below the first pollutant limit value, testing if the bypasser is completely closed,
Step I1: in response to determining in the Step H1 that the bypasser is completely closed, testing if on the blower device a maximum flow rate is adjusted,
Step J1: in response to determining in the Step I1 that on the blower device the maximum flow rate is adjusted, continuing the current air quality testing cycle according to Step O.

7. The method according to claim 6, wherein the air quality testing cycle in the comfort mode additionally includes the following steps:
Step K1: in response to determining in the Step I1 that on the blower device the maximum flow rate is not adjusted, actuating the flap device for increasing the circulating air content by one step,
Step L1: after the amendment of the flow rate by one step, resetting the current air quality testing cycle to Step A.

8. The method according to claim 6, wherein the air quality testing cycle in the comfort mode additionally includes the following steps:
Step M1: in response to determining in the Step H1 that the bypasser is not completely closed, actuating the bypasser for closing by one step,
Step N1: after the closing of the bypasser by one step, resetting the current air quality testing cycle to Step A.

9. The method according to claim 1, wherein the air quality testing cycle is carried out in a service life mode where the Steps B and D are changed to the Steps B2 and D2 as follows:
Step B2: in response to determining in the Step A that the current pollutant concentration is below the first pollutant limit value, testing if the current flow rate of the blower device corresponds to a current air volume demand of the air-conditioning system,
Step D2: in response to determining in the Step B2 that the current flow rate does not correspond to the current air volume demand, testing if the current pollutant concentration is below the second pollutant limit value.

10. The method according to the claim 9, wherein the service life mode includes Step C2 as follows:
Step C2: in response to determining in the Step B1 that the bypasser is completely open, continuing the current air quality testing cycle according to Step O.

11. The method according to claim 9, wherein the air quality testing cycle in the service life mode additionally includes the following steps:

Step F2: in response to determining in the Step D2 that the current pollutant concentration is below the second pollutant limit value, actuating the flap device for reducing the circulating air content in the air stream by one step, Step G2: after reducing the circulating air content in the air stream by one step, resetting the current air quality testing cycle to Step A.

12. The method according to claim 9, wherein the air quality testing cycle in the service life mode additionally includes the following steps:

Step H2: in response to determining in the Step A that the current pollutant concentration is not below the first pollutant limit value, testing if on the blower device a maximum flow rate is adjusted, Step I2: in response to determining in the Step H2 that on the blower device the maximum flow rate is adjusted, testing if the bypasser is completely closed, Step J2: in response to determining in the Step I2 that the bypasser is completely closed, continuing the current air quality testing cycle according to Step O.

13. The method according to claim 12, wherein the air quality testing cycle in the service life mode additionally includes the following steps:

Step K2: in response to determining in the Step I2 that the bypasser is not completely closed, actuating the bypasser for closing by one step, Step L2: after the closing of the bypasser by one step, resetting the current air quality testing cycle to Step A.

14. The method according to claim 12, wherein the air quality testing cycle in the service life mode additionally includes the following steps:

Step M2: in response to determining in the Step H2 that on the blower device the maximum flow rate is not adjusted, actuating the flap device for increasing the circulating air content in the air stream by one step, Step N2: after the amendment of the circulating air content in the air stream by one step, resetting the current air quality testing cycle to Step A.

15. The method according to claim 1, wherein in the air quality testing cycle prior to Step A, a minimum content of fresh air in the air stream is determined and the flap device is activated for adjusting a circulating air content correlating with the minimum content of fresh air.

16. The method according to claim 1, wherein in the air quality testing cycle prior to Step A, an air volume demand of the air-conditioning system is determined and the blower device is actuated for adjusting a flow rate correlating to the air volume demand.

17. The method according to claim 1, further comprising carrying out a dirt source detection cycle that comprises the following steps:

Step P1: testing if a current dirt concentration in the vehicle interior is below a predetermined dirt limit value, Step Q1: in response to determining in the Step P1 that the dirt concentration in the vehicle interior is below the dirt limit value, determining that no additional internal source of dirt is present, and continuing source detection cycle according to Step V1, Step R1: in response to determining in the Step P1 that the dirt concentration in the vehicle interior is not below the dirt limit value, actuating the flap device for adjusting to circulating air mode, so that the air stream contains a maximum circulating air content, Step S1: after the adjusting of the circulating air mode, testing if an actual decrease of the dirt concentration in the vehicle interior is greater than an expected decrease of the dirt concentration in the vehicle interior calculated by way of service life data of the main filter device and of the additional filter device, Step T1: in response to determining in the Step S1 that the actual decrease is greater than the expected decrease, determining that no additional internal source of dirt is present and continuing the dirt source detection cycle according to Step V1, Step U1: in response to determining in the Step S1 that the actual decrease is not greater than the expected decrease, determining that an additional internal source of dirt is present and continuing the dirt source detection cycle according to Step V1, Step V1: terminating the current dirt source detection cycle.

18. The method according to claim 1, further comprising carrying out a dirt source detection cycle that comprises the following steps:

Step P2: calculating an expected dirt concentration in the vehicle interior by way of a current dirt concentration in the vehicle surroundings and current service life data of the main filter device and the additional filter device, Step Q2: measuring a current dirt concentration in the vehicle interior and testing if the currently measured dirt concentration is within a predetermined tolerance range, Step R2: in the event that the currently measured dirt concentration is within the tolerance range, determining that no additional internal source of dirt is present, and continuing the dirt source detection cycle according to Step V2, Step S2: in the event that the currently measured dirt concentration is not within the tolerance range, testing if the currently measured dirt concentration is greater than the expected dirt concentration, Step T2: in the event that it is determined in the Step S2 that the currently measured dirt concentration is greater than the expected dirt concentration, determining that an additional internal source of dirt is present, and continuing the dirt source detection cycle according to Step V2, Step U2: in the event that it is determined in the Step S2 that the currently measured dirt concentration is not greater than the expected dirt concentration, determining that an additional internal dirt sink is present, and continuing the dirt source detection cycle according to Step V2, Step V2: terminating the current dirt source detection cycle.

19. The method according to claim 17, wherein in the event that the dirt source detection cycle results in that the presence of an additional internal source of dirt is determined, the air quality testing cycle is modified so that that in a comfort mode the Step K1 is carried out so that that the circulating air content is reduced by one step.

20. The method according to claim 17, wherein in the event that the dirt source detection cycle results in that the presence of an additional internal source of dirt is determined, the air quality testing cycle is modified so that that in service life mode the Step M2 is carried out so that that the circulating air content is reduced by one step.

21. An air-conditioning system of a motor vehicle having a vehicle interior, wherein the air-conditioning system serves for air-conditioning an air stream provided for being introduced into the vehicle interior that includes at least one of circulating air and fresh air, wherein the air-conditioning system comprises:

a flap device that is adjustable in multiple stages with respect to a circulating air content in the air stream, a blower device that is adjustable in multiple stages with respect to its flow rate for driving the air stream in a flow direction, a main filter device for filtering the air stream, an additional filter device for filtering the air stream, a bypasser that is adjustable in multiple stages for opening and closing for bypassing the additional filter device, an air quality sensor device for detecting a current pollutant concentration in the air stream, and a controller which for operating the air-conditioning system is coupled to the flap device, to the blower device, to the bypasser and to the air quality sensor device and is at least one of configured and programmed for carrying out an air quality testing cycle that includes the following steps:

Step A: testing if the current pollutant concentration is below a predetermined first pollutant limit value, Step B: in the event that it is determined in the Step A that the current pollutant concentration is below the first pollutant limit value, testing if the bypasser is completely open or if the current flow rate of the blower device corresponds to a current air volume demand of the air-conditioning system, Step D: in the event that it is determined in the Step B that the bypasser is not completely opened or that the current flow rate does not correspond to the current air volume demand, testing current pollutant concentration is below a predetermined second pollutant limit value that is smaller than the first pollutant limit value, Step E: in the event that it is determined in the Step D that the current pollutant concentration is not below the second pollutant limit value, continuing the current air quality testing cycle according to Step O, Step O: terminating the current air quality testing cycle.

* * * * *